US012804271B2

(12) United States Patent
Li et al.

(10) Patent No.: US 12,804,271 B2
(45) Date of Patent: Nov. 17, 2026

(54) SYSTEM AND METHOD FOR HDR DETECTION AND EXPOSURE SETTING

(71) Applicant: Black Sesame Technologies Inc., San Jose, CA (US)

(72) Inventors: Ang Li, Singapore (SG); Shanlan Shen, Singapore (SG); Yubo Duan, Singapore (SG)

(73) Assignee: BLACK SESAME TECHNOLOGIES INC., San Jose, CA (US)

( * ) Notice: Subject to any disclaimer, the term of this patent is extended or adjusted under 35 U.S.C. 154(b) by 35 days.

(21) Appl. No.: 19/002,474

(22) Filed: Dec. 26, 2024

(65) Prior Publication Data

US 2026/0189797 A1 Jul. 2, 2026

(51) Int. Cl.

| | |
|---|---|
| ***H04N 23/72*** | (2023.01) |
| ***G06V 10/82*** | (2022.01) |
| ***G06V 20/00*** | (2022.01) |
| ***H04N 23/71*** | (2023.01) |
| ***H04N 23/73*** | (2023.01) |
| ***H04N 23/741*** | (2023.01) |

(52) U.S. Cl.

CPC ............. *H04N 23/72* (2023.01); *G06V 10/82* (2022.01); *G06V 20/35* (2022.01); *H04N 23/71* (2023.01); *H04N 23/73* (2023.01); *H04N 23/741* (2023.01); *G06V 2201/10* (2022.01)

(58) Field of Classification Search

CPC ........ H04N 23/72; H04N 23/71; H04N 23/73; H04N 23/741; G06V 10/82; G06V 20/35; G06V 2201/10

See application file for complete search history.

(56) References Cited

U.S. PATENT DOCUMENTS

| | | | | |
|---|---|---|---|---|
| 2007/0196097 | A1* | 8/2007 | Sugimoto | G03B 7/08 396/234 |
| 2020/0348580 | A1* | 11/2020 | Pan | H04N 23/71 |
| 2022/0138964 | A1* | 5/2022 | Gintsburg | G06T 7/246 382/103 |
| 2025/0285433 | A1* | 9/2025 | Hammond | G06V 10/764 |

* cited by examiner

*Primary Examiner* — Yogesh K Aggarwal

(74) *Attorney, Agent, or Firm* — Shun Yao; Yao Legal Services, Inc.

(57) ABSTRACT

The disclosure describe a system and method for determining High Dynamic Range (HDR) exposure settings of a camera for capturing a scene. The system determines a baseline exposure value of the camera for capturing the scene and obtains a preview image of the scene captured by the camera using the baseline exposure. The system applies a machine-learning technique on the preview image to determine, among a plurality of predetermined scene categories, a scene category corresponding to the scene and determines, based on the scene category corresponding to the scene, an HDR exposure range. The system further detects a number of objects in the scene and determines, based on the HDR exposure range, the one or more detected objects in the scene, and metadata associated with the camera, an exposure combination specifying one or more exposure values and a number of frames to be captured corresponding to each exposure value.

14 Claims, 6 Drawing Sheets

100

100

SYSTEM AND METHOD FOR HDR DETECTION AND EXPOSURE SETTING

FIELD

This disclosure generally relates to High Dynamic Range (HDR) imaging. More specifically, the disclosed systems relate to using machine learning techniques to improve the efficiency in determining optimal HDR exposure settings.

RELATED ART

High Dynamic Range (HDR) techniques have been used widely in photography, imaging, and video to enhance the range of the captured and displayed light and color. Traditional cameras and screens often struggle with scenes with a high contrast between light and dark areas, resulting in images where highlights may appear washed out and shadows are too dark, lacking detail. HDR solves the above problem by expanding the range of luminance and color, making it possible to capture and display the scene in greater detail across both the brightest and darkest areas within the scene.

HDR imaging generally involves taking multiple images of the same scene at different exposure levels (such as underexposed, normally exposed, and overexposed) and merging them into a single image. Combining multiple images in this way results in an image with a greater dynamic range than an image taken under a single exposure. The merged image (may be referred to as an HDR image) preserves details in both the bright and dark areas that would be lost in a single exposure, producing a more balanced and realistic image. Different scenes have different dynamic ranges and may require different exposure settings.

SUMMARY

Embodiments of this disclosure can provide a system and method for determining High Dynamic Range (HDR) exposure settings of a camera for capturing a scene. During operation, the system determines a baseline exposure value of the camera for capturing the scene and obtains a preview image of the scene captured by the camera using the baseline exposure. The system applies a machine-learning technique on the preview image to determine, among a plurality of predetermined scene categories, a scene category corresponding to the scene and determines, based on the scene category corresponding to the scene, an HDR exposure range. The system further detects a number of objects in the scene and determines, based on the HDR exposure range, the one or more detected objects in the scene, and metadata associated with the camera, an exposure combination specifying one or more exposure values and a number of frames to be captured corresponding to each exposure value.

In a variation on this embodiment, applying the machine-learning technique can include implementing a multi-task deep-learning neural network to simultaneously determine the scene category corresponding to the scene and detect the one or more objects.

In a variation on this embodiment, the plurality of predetermined scene categories can include sunny outdoor, cloudy outdoor, snowy outdoor, rainy outdoor, foggy outdoor, sunrise/sunset, nighttime outdoor, nighttime mall, indoor mall, and indoor stage.

In a variation on this embodiment, the system can identify, among the number of detected objects, a number of significant objects based on the size and position of each object.

In a further variation, determining the exposure combination comprises determining, for each significant object, an optimal exposure value based on the brightness level of the object and a target brightness level.

In a further variation, determining the exposure combination can include determining, for each significant object, an optimal exposure value based on the brightness level of the object and a target brightness level.

In a further variation, determining the exposure combination can include outputting a default exposure combination corresponding to the HDR exposure range in response to determining that the scene contains no significant object.

In a variation on this embodiment, determining the exposure range can include looking up a previously established lookup table based on the scene ID and brightness level of the scene.

In a variation on this embodiment, the lookup table can be established by performing tests to determine maximum and minimum exposure values of a plurality of scenes with known scene categories and different brightness levels.

DESCRIPTION OF THE FIGURES

In the figures, like reference numerals refer to the same figure elements.

DETAILED DESCRIPTION

Figure 1:
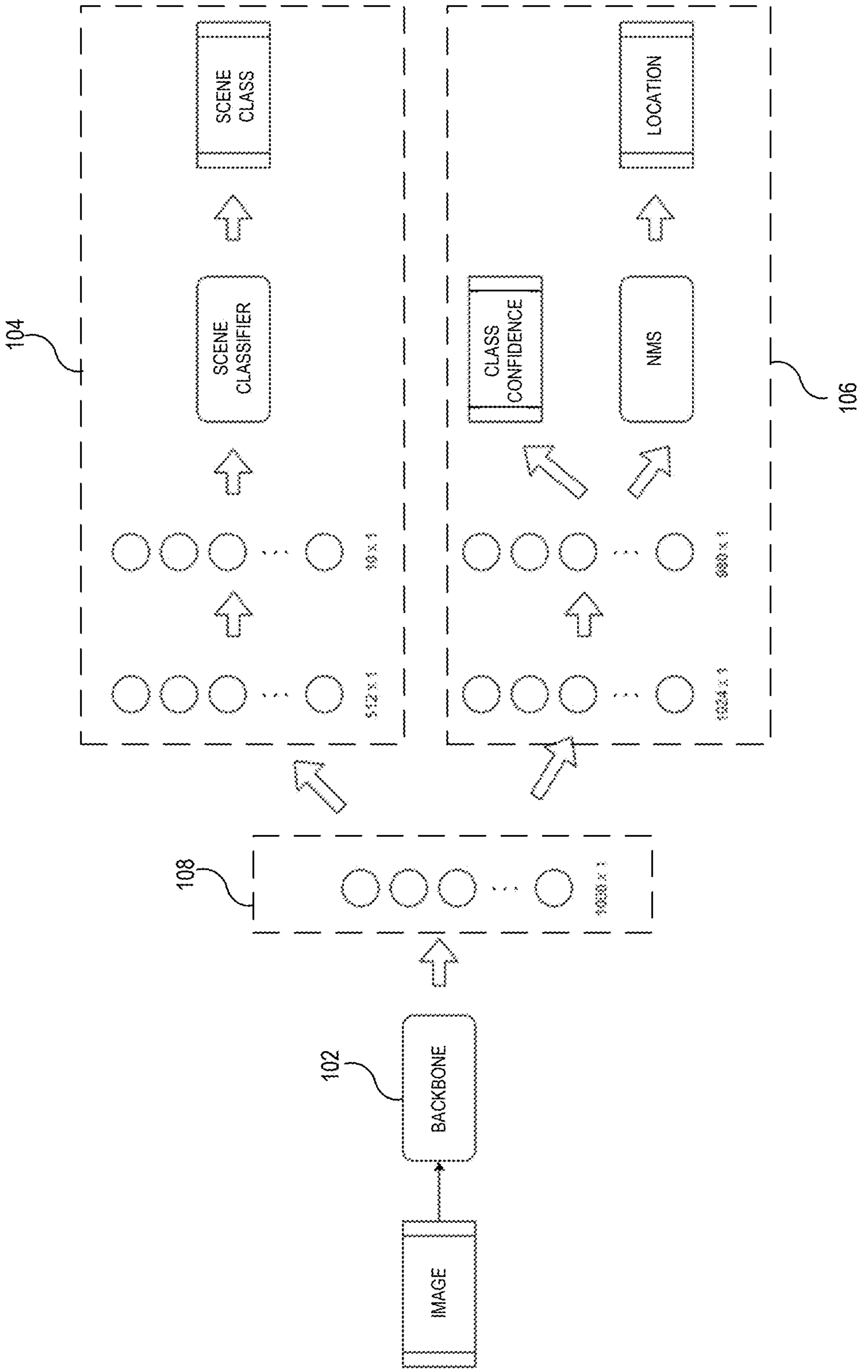
FIG. 1 illustrates an exemplary machine learning architecture for simultaneous scene classification and object detection, according to one embodiment of the instant application.

The following description is presented to enable any person skilled in the art to make and use the disclosed embodiments and is provided in the context of one or more particular applications and their requirements. Various modifications to the disclosed embodiments will be readily apparent to those skilled in the art, and the general principles defined herein may be applied to other embodiments and applications without departing from the scope of those that are disclosed. Thus, the present invention or inventions are not intended to be limited to the embodiments shown, but rather are to be accorded the widest scope consistent with the disclosure.

Overview

Embodiments of this disclosure provide a system and method for detecting an HDR scene and setting HDR exposure parameters automatically. A camera system may use machine learning techniques on a camera preview image to classify a to-be-captured scene and detect one or more objects in the scene. The system may determine whether the scene is an HDR scene based on the determined scene category and illumination statistics. For an HDR scene, the system may look up a previously established scene-LUX-EV-lookup table to determine the exposure range. The system may identify one or more significant objects within the scene. The system may further fine-tune the exposure settings (e.g., the exposure values (EVs), the number of shots per EV, etc.) based at least on the brightness of the identified significant objects and the camera metadata.

HDR Exposure Setting Based on Scene Classification and Object Detection

Exposure settings are crucial in HDR imaging, as they determine the range of light and detail captured across multiple images, significantly affecting the quality of the final HDR image. Optimal exposure settings during the image capture can ensure that details across the entire brightness range are preserved, reducing noise, avoiding artifacts, and enhancing overall image quality.

Conventional HDR-detection methods are typically based on the intensity statistic of the preview images. However, due to the large variations in different types of real-life scenes with different types of objects, light intensity statistics may not provide sufficient information for further HDR operations due to the easily saturated pixel intensity. This is because different scenes and semantic combinations require different dynamic ranges, exposure values, and number of shots per exposure. For example, although both are high-contrast scenes, a nighttime scene with large, illuminated signboards and a daytime backlit scene with windows have different dynamic ranges. For daytime scenes using the sky as the background, the one with a human figure as the main subject and the one with a building as the main subject have different lighting ratios, requiring different EV settings. In a different example, one portrait using the sky as the background and another using a building as the background may have different brightness on the portrait subject, requiring different numbers of frames to reduce noise.

Auto exposure (AE) control has been widely used in modern digital cameras to set the exposure time of a camera based on the lighting condition of a to-be-captured scene, allowing both amateur and professional photographers to capture well-exposed images in various lighting conditions. Applying AE control in HDR imaging can be challenging, as conventional AE control methods do not work well in high-contrast or unusual settings. Advanced AE solutions may include auto exposure bracketing (AEB) that enables a camera to automatically take two or more images with different exposure values. However, existing AEB solutions often use fixed exposure parameters (e.g., fixed exposure step and/or number of frames per exposure), which could limit the dynamic range of captured images, causing loss of details in the bright or dark areas of the scene.

The HDR exposure combination of a to-be-captured scene is intricately linked to the type of scene and objects within the scene. Different types of scenes demand varying exposure ranges, necessitating an adaptive approach to capture the full spectrum of visual information. In outdoor night scenes, for instance, the presence of very dark elements (e.g., trees, grass, backlit portraits, etc.) calls for brighter exposures to recover the dynamic range in these shadowy areas, a technique known as shadow lifting. Conversely, relatively bright elements (e.g., streetlamps, car lights, illuminated signs, etc.) in the same scene may require darker exposures to preserve detail in these high-intensity areas, a process referred to as highlight suppression. Outdoor daytime scenes present a different set of challenges compared to their nighttime counterparts. The brightness of well-lit areas in daylight scenes is predominantly determined by sunlight, which typically surpasses the intensity of artificial light sources encountered at night, thus requiring darker exposures to effectively capture the dynamic range of bright areas. However, the generally favorable lighting conditions during the day mean that recovering detail in darker areas does not require exposures as bright as those needed in nighttime outdoor scenes. The difference in the exposure requirements for light and shadow areas in different scenarios underscores the importance of flexible and context-aware HDR exposure strategies.

In some embodiments of the instant application, machine-learning techniques may be used to learn the context of a to-be-captured scene based on the camera preview image. More specifically, a multi-task learning approach in deep learning may be adopted to simultaneously learn the classification of the scene and one or more objects in the scene based on a plurality of predetermined scene categories and object categories. The learned scene-category information combined with the light intensity statistics may be used to determine whether HDR is triggered.

FIG. 1 illustrates an exemplary machine learning architecture for simultaneous scene classification and object detection, according to one embodiment of the instant application. In FIG. 1, machine learning architecture 100 includes a single backbone 102 and two prediction heads, a scene-classification head 104, and an object-detection head 106. In some embodiments, machine learning architecture 100 may be implemented on a mobile device (e.g., a smartphone or a tablet computer) equipped with a camera.

Backbone 102 may include a feature-extracting network that processes input data (e.g., a camera preview image 108) into a certain feature representation. Examples of the feature-extracting networks implemented in backbone 102 may include ShuffleNet V2 and SqueezeNet. In alternative examples, a network architecture search (NAS) may be performed based on the computational power of the mobile platform to find a neural network that is most suitable for the current mobile platform. Considering the real-time requirements of mobile devices, in one example, MobileNetV3 may be used to perform the NAS to design the network in backbone 102. In the example shown in FIG. 1, the last layer of backbone 102 may include 1000 nodes to generate an output array 108 with a size of 1000×1.

Scene-classification head 104 is used to classify the scene based on the extracted features and a plurality of predetermined scene categories. In some embodiments, based on the lighting (e.g., day vs. night or indoor vs. outdoor) and weather (e.g., sunny vs. cloudy) conditions, the system may be pre-trained (e.g., using a large number of labeled images) to categorize all scenes into at least ten scene categories, including sunny outdoor, cloudy outdoor, snowy outdoor, rainy outdoor, foggy outdoor, sunrise/sunset, nighttime outdoor, nighttime mall, indoor mall, and indoor stage. Other ways to categorize the scenes are also possible. The scope of this application is not limited to the way scenes are categorized and the number of scene categories.

In one embodiment, scene-classification head 104 may include a multi-layer neural network with two fully connected layers. The first layer may use output array 108 of backbone 102 as an input with a size of 1000×1 and output an array with a size of 512×1. The second layer takes the 512×1 array as an input and outputs a 10×1 array, followed by a sigmoid layer for classification. The classification output typically provides a confidence score for each category, and the category with the highest confidence score may be the learned scene category. In one example, scene-classification head 104 may output a scene class or scene identifier (ID). When the confidence scores for all categories fall below a predetermined threshold, scene-classification head 104 may output a scene ID as "other." In one example, the predetermined threshold is set at 50%, and it can be adjusted based on the actual usage scenario.

Object-detection head 106 is used to detect objects in the scene based on the extracted features and a plurality of predetermined object categories. In some embodiments, object-detection head 106 may implement the You Only Look Once (YOLO) algorithm. More specifically, two fully connected layers may be added after the last layer of 1000 nodes in the backbone network (e.g., MobileNetV3). The first layer may take array 108 as an input with a size of 1000×1 and output an array with a size of 1024×1. The second layer takes the 512×1 array as an input and outputs a 980×1 array, which may include the probabilities for 10 object categories (7×7×10), confidence scores for bounding boxes (7×7×2), and the position information for bounding boxes (7×7×2×4). Object-detection head 106 may obtain the class or category confidence by multiplying the category probabilities and bounding box confidence scores. Object-detection head 106 may also implement non-maximum suppression (NMS) to obtain the locations corresponding to category objects. In one example, the output of object-detection head 106 may include bounding boxes marking the positions of all objects in the current scene.

In some embodiments, there may be ten predetermined object categories, including person, window, sun, moon, vegetation, flower, food, building, animal, and text. Additional or different object categories may also be possible. The scope of this application is not limited to the way objects are categorized and the number of object categories. For each detected object, object-detection head 106 may provide a confidence score for each object class/category. The category with the highest confidence score may be the learned object category for the detected object, and a corresponding object ID may be assigned to the detected object. When the confidence scores for all object categories fall below a predetermined threshold (e.g., 50%), the object ID of the object may be "other."

Scene-classification head 104 and object-detection head 106 may be trained simultaneously using labeled training samples. For example, a large number of images containing scenes and objects belonging to the aforementioned scene categories and object categories may be collected and manually annotated to create training data pairs. An exemplary training sample may include an image labeled with a scene ID and a number of bounding boxes, each bounding box associated with an object ID to indicate the position and object category of a detected object.

In certain situations, the aforementioned ten scene categories and ten object categories may be insufficient to describe all images. In such a situation, the deep learning neural networks in scene-classification head 104 and object-detection head 106 may be redesigned to accommodate the expanded data and categories. The specific approach involves defining new scene and object categories. Once defined, corresponding images that include these new scenes and objects may be collected and labeled (e.g., with new scene IDs and object IDs).

In one example, redesigning scene-classification head 104 may include modifying the last fully connected layer (with an input size of 512×1 and an output size of 10×1) to have an input size of 512×1 and an output size of (10+n)×1, where n represents the number of newly added scene categories. Similarly, redesigning object-detection head 106 may include modifying the last fully connected layer (with an input size of 512×1 and an output size of 980×1) to have an input size of 1024×1 and an output size of 7×7×(10+n)+7×7×2+7×7×2×4, where n represents the number of newly added object categories. The regression of 7×7×(10+n) predicts the probabilities for 10+n categories. The regression of 7×7×2 predicts the confidence scores for the bounding boxes. Multiplying these two values yields the category confidence. Finally, the 7×7×2×4 nodes regress the position information of the bounding boxes. NMS may be similarly applied to obtain the positions corresponding to the categorized objects.

The output from the machine learning module illustrated in FIG. 1 plays a crucial role in determining the exposure range, which in turn defines the maximum recoverable dynamic range of an image. In some embodiments, an exposure-range-setting module may be used to determine the upper and lower threshold of the exposure setting based on the detected scene category (e.g., the scene ID), the camera preview image, the current luminance condition (e.g., the LUX value), and a predetermined previously established scene-LUX-EV table.

In some embodiments, the camera system may pre-collect and compile optimal exposure ranges for scenes with different illuminance values (or brightness levels) within each predetermined category and then summarize the mappings into a lookup table (referred to as a scene-LUX-EV table) such that the exposure range of a to-be-captured scene may be swiftly determined by looking up the table using the combination of the scene ID and illuminance (LUX) value as the search key.

Establishing the scene-LUX-EV table may involve determining, beforehand, the exposure ranges for scenes of different categories and brightness levels. For example, the system may perform tests to determine the optimal exposures for a large number of scenes in a particular scene category. It is important to note that the theoretical dynamic range an image can restore is fundamentally constrained by the camera hardware's maximum dynamic range capability, which is directly influenced by exposure levels. Long exposure frames, captured with extended exposure times, may enhance the dynamic range of dark areas within an image. Conversely, short exposure frames, obtained with brief exposure times, may improve the dynamic range of bright areas. In scenarios where the hardware limitations of the camera prevent achieving the maximum dynamic range in dark areas even with the longest possible exposure, multiple frames captured using the longest exposure settings may further enhance the dynamic range of dark areas, effectively serving as the upper limit for exposure levels.

Figure 2:
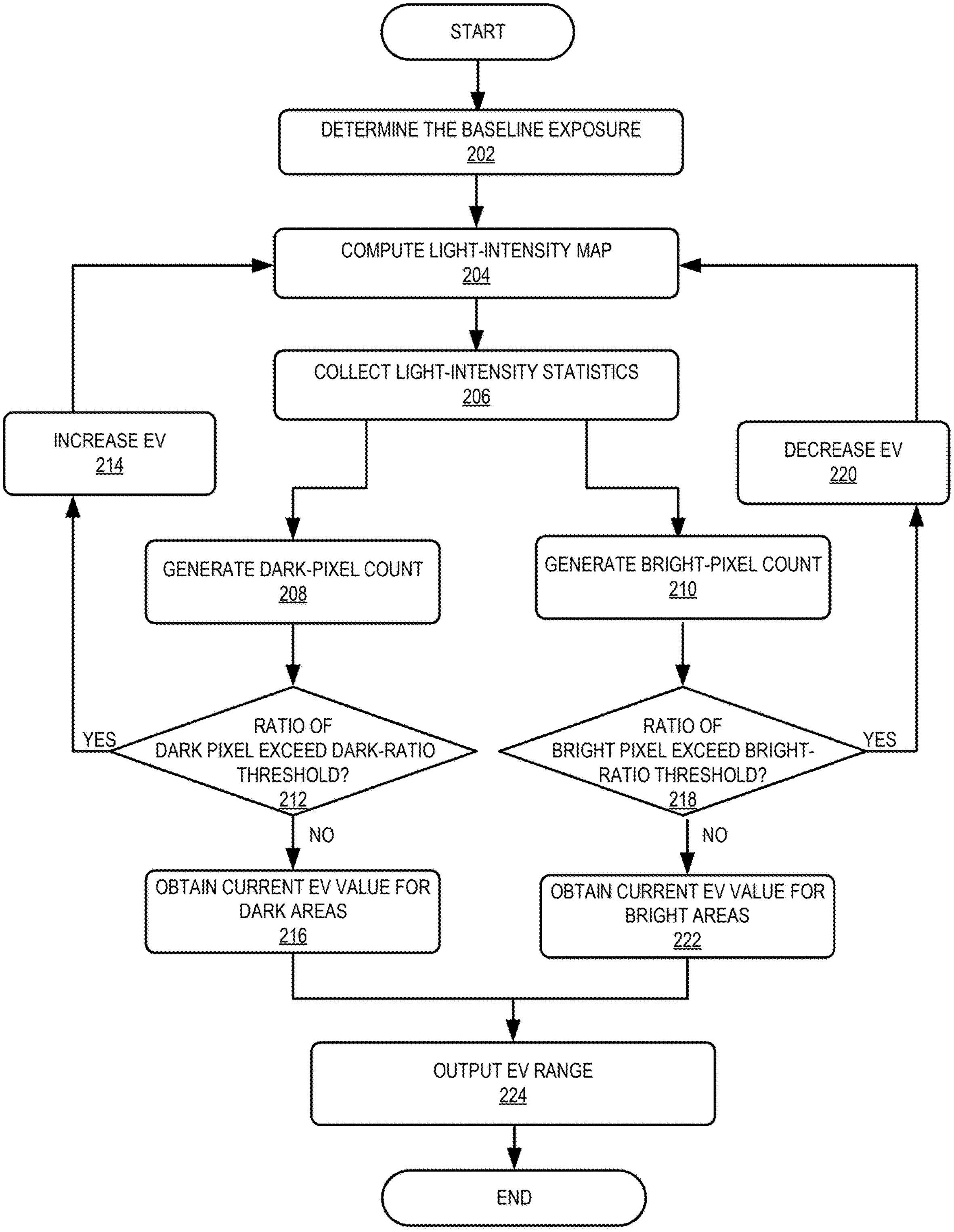
FIG. 2 presents a flowchart illustrating an exemplary process for determining the exposure range of a scene, according to one embodiment of the instant application.

FIG. 2 presents a flowchart illustrating an exemplary process for determining the exposure range of a scene, according to one embodiment of the instant application. During operation, the camera system may determine (e.g., based on a preview image) the baseline exposure value (denoted $EV_0$) of a to-be-captured scene (operation 202). The camera system may determine $EV_0$ using a standard metering method (e.g., global average metering or center-weighted metering). The preview image is typically obtained using $EV_0$.

The system may compute the light-intensity map (referred to as the Y image) of the current scene (operation 204) and collect the light-intensity statistics (operation 206). The light-intensity map may be constructed based on the brightness value of each pixel. In one example, the brightness value of a pixel may be the maximum or average value of the RGB (red, green, and blue) channels.

The system may generate a dark-pixel count based on a pixel-darkness threshold (operation 208) and generate, simultaneously, a bright-pixel count based on a pixel-brightness threshold (operation 210). In some embodiments, the system may traverse all pixels in the image to count the number of dark pixels and the number of bright pixels. A pixel is considered a dark pixel if its brightness value is below the pixel-darkness threshold. In some examples, each pixel value may be represented using 8-bit standard RGB (SRGB), and the pixel-darkness threshold may be set as 10 or 20. The darkness threshold may be set to a different value for different color resolutions, such as 10-bit or 12-bit SRGB. A pixel is considered a bright pixel if its brightness value is equal to or greater than the pixel-brightness threshold, which is typically set to the brightness saturation value. For example, for 8-bit SRGB, the brightness threshold may be set as 255.

The system may process dark areas (i.e., dark pixels) and bright areas (i.e., bright pixels) in parallel. For the dark areas, the system may determine whether the ratio of dark pixels against the total number of pixels in the image exceeds a predetermined dark-ratio threshold (operation 212). In some embodiments, the dark-ratio threshold may be set to 1/10. Other ratios (e.g., 1/8 or 1/12) may also be possible. In further embodiments, the dark-ratio thresholds for different scene categories (or scene IDs) may be set to different values. For example, in sunny outdoor scenes, the likelihood of dark areas is lower, so the dark-ratio threshold can be set to a smaller value (e.g., 1/15). If the ratio of dark pixels in the image is equal to or greater than the dark-ratio threshold (meaning there are very dark regions in the scene that need to be brightened), the EV value may be increased (operation 214). Note that the EV value may start with the baseline value (i.e., $EV_0$) and increase by a predetermined amount (e.g., one) in each iteration. The camera system may recompute the light-intensity map of the current scene under the increased EV (operation 204). The process continues until the ratio of dark pixels in the image is less than the dark-ratio threshold (meaning that the scene is sufficiently illuminated), and the camera system may then obtain the current EV value for the dark areas (operation 216). Such an EV value may represent the maximum EV needed to bright up the dark areas in the scene.

When the pixel-brightness threshold is set to the brightness saturation value (e.g., 255 in the 8-bit SRGB domain), information in the saturated area is not known. Therefore, frames with baseline exposure (i.e., $EV_0$) cannot provide sufficient information to determine the exposure setting for short exposure frames. In some embodiments, for the bright (or saturated) areas, the system may determine whether the ratio of bright pixels (e.g., pixels with saturated brightness) against the total number of pixels in the image exceeds a predetermined bright-ratio threshold (operation 218). In some embodiments, the bright-ratio threshold may be set to zero because, ideally, there should be no pixels with saturated brightness. It is also possible to set the bright-ratio threshold to some small numbers.

If the ratio of bright pixels is greater than the bright-ratio threshold, the EV value may be decreased (operation 220). Note that the EV value may start with the baseline value (i.e., $EV_0$) and be decreased by a predetermined amount (e.g., one) in each iteration. The process repeats until the ratio of bright pixels is greater than the bright-ratio threshold (i.e., the exposure has been reduced to eliminate saturated areas in the image). In alternate examples, multiple shots with different exposure values (e.g., EV−1, EV−2, EV−3, EV−4, etc.) may be taken, and a suitable exposure value may be selected from them. The camera system may then obtain the current EV value for the bright areas (operation 222). Such an EV value may represent the minimum EV needed to prevent saturation.

The camera system may then output the exposure range for the current scene (operation 224). Note that the final exposure value for the dark areas corresponds to the upper bound of the exposure range, whereas the final exposure value for the bright areas corresponds to the lower bound of the exposure range. If the image captured using the baseline exposure (i.e., $EV_0$) does not meet conditions set in operations 212 and 214 (i.e., the dark and bright ratios are below the corresponding threshold), $EV_0$ is considered a suitable exposure range. In such a case, the upper and lower bounds of the exposure range may both be set to $EV_0$. The scene may be considered a non-HDR scene.

Using the exemplary process shown in FIG. 2, before being put into usage, a camera system may conduct tests on predefined or constructed scenes in the different known scene categories. Conducting the tests may also include determining the illuminance (LUX) value of each scene. Most camera systems include a light sensor that can measure the LUX value, which objectively represents the brightness level of the current scene. For each scene category, the camera system may use a lookup table to establish the relationship between LUX, the bright area size under the baseline exposure, and the exposure range (e.g., by storing the mapping between the LUX value and the exposure range in a table). Other than the lookup table, the camera system may also apply a fitting function or machine learning regression method to establish such a relationship. The system may also use the lookup table (or alternative methods such as fitting functions or machine learning models) to find and interpolate the exposure ranges for new testing scenarios (e.g., different scenes or scenes with different LUX values).

Once the optimum exposure range of a to-be-captured scene is determined (e.g., based on the scene ID, the LUX value, and the scene-LUX-EV table), it may be possible to traverse all exposure values within the determined exposure range based on the camera system's minimum exposure step (EV step). In one example, a camera system's minimum exposure step is one or six, and the camera may implement an exposure combination that increments, in each step, by one or six from the minimum EV to the maximum EV. It is also possible to capture as many frames as possible for each EV to improve the signal-to-noise ratio. However, such an approach is computationally expensive and time consuming. Capturing a scene using more EVs leads to a longer processing time for subsequent algorithms, negatively affecting the photography experience. In addition, more EVs increase the capture time, resulting in increased complexity in handling moving objects. This indirectly increases the algorithm processing time, making it difficult for the algorithm to recover information about fast-moving objects, potentially resulting in artifacts in the processed results.

It is desirable to determine the appropriate exposure combination for a to-be-captured scene (i.e., how many exposures are needed and how many shots are needed for each exposure) to improve the performance of the camera system. In some embodiments, the camera system may refine the HDR exposure combination by integrating object detection and the system information of the current scene. More specifically, based on the position information of all objects in the current scene and confidence scores for their respective categories (which are results of the object detection), the camera system may fine-tune the exposure combination.

In some examples, the object-detection process may output no object, indicating no significant object detected in the current scene. Accordingly, the system may bypass the process for fine-tuning the exposure combination and output a predetermined default exposure combination corresponding to the scene category. The default exposure combination may include the exposure range (determined based on the scene-LUX-EV table), exposure steps, and the number of frames to be taken for each exposure. This default exposure combination may be determined primarily based on the subsequent performance and processing effects of the HDR algorithm on a specified platform (e.g., a mobile platform). The runtime speed can be evaluated by deploying the algorithm to the specified platform, manually setting the exposure combination, and capturing scenes of different categories (e.g., the aforementioned ten predetermined scene categories). The performance data and processing effects are then used to strike a balance between effectiveness and performance, determining the exposure combination. As exposure compensation increases, there is a notable improvement in dynamic range recovery, allowing for enhanced detail preservation in both highlights and shadows. However, the process of increasing exposure compensation often necessitates capturing a higher number of frames, which may lead to reduced performance.

Figure 3:
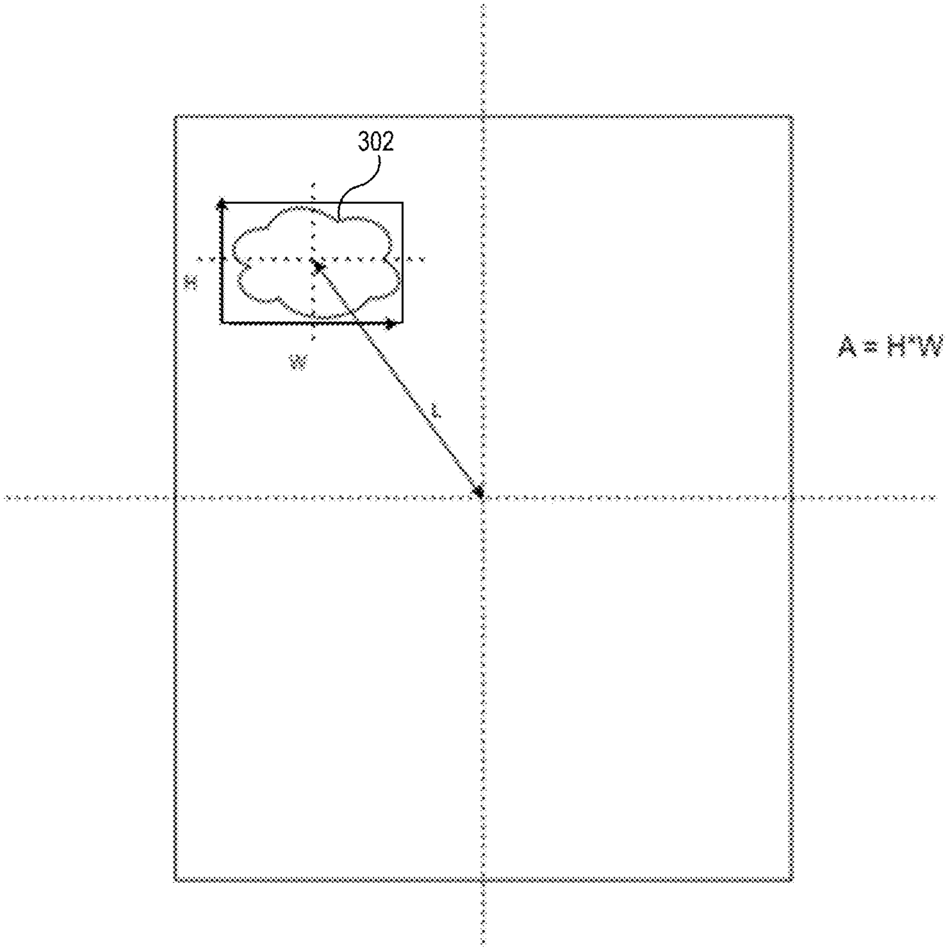
FIG. 3 illustrates an exemplary scenario for determining whether an object is significant, according to one embodiment of the instant application.

In some examples, the object-detection process may output one object. The system may determine whether the object is significant based on its size and distance to the image center. FIG. 3 illustrates an exemplary scenario for determining whether an object is significant, according to one embodiment of the instant application. In FIG. 3, the bounding box of an object 302 has a height H and a width W. The distance between the center of the bounding box and the image center is denoted L. In some embodiments, the significance level of object 302 may be computed according to:

$$I = \frac{H \times W}{(L + \varepsilon)^2},$$

where ε is a small value (e.g., $\varepsilon = 1 \times 10^{-8}$).

A large object close to the image center tends to have a higher significance level, whereas a small object far away from the image center will have a lower significance level. In further embodiments, the system may compare the significance level of the detected object with a predetermined threshold. If the object's significance level is below the predetermined threshold, the object is considered insignificant, and the system may output the default exposure combination, similar to the scenario where no object is detected in the current scene. On the other hand, if the object's significance level equals or exceeds the predetermined threshold, the object is considered significant, and the system may fine-tune the exposure combination based on the brightness and noise level of the object.

In some embodiments, the system may perform a linear domain regression operation on the detected object to bring the detected object back to the linear domain (i.e., the pixel values recorded by the camera's sensor being directly proportional to the amount of received light). Generally speaking, the baseline exposure $EV_0$ corresponds to a set of camera metadata, which typically includes parameters like ISO, exposure time, camera analog gain, camera digital gain, Image Signal Processing (ISP) Gain, Auto White Balance (AWB) gain, Color Correction Matrix (CCM), Gamma, etc. Techniques such as inverse gamma correction, inverse CCM transformation, inverse AWB gain, and inverse ISP Gain can be used to bring the detected object back to the linear domain.

The system may then calculate the mean brightness Y of the detected object. In some embodiments, the system may use the maximum value of the three channels (red, green, and blue) to represent the mean brightness Y of the current object. It is also possible to use other values to represent Y. In one example, the brightness may be the Y component in the YUV color space or the average of the three channels. The system may compute the exposure ratio R based on the brightness of the detected object and a predetermined target brightness. In one example, R=T/Y. The exposure ratio may be used to determine the optimal exposure setting for the current object. An exposure ratio greater than one indicates that the object requires a brighter image for dynamic range recovery, so the EV should be increased. On the other hand, an exposure ratio smaller than one indicates that the object requires a darker image for dynamic range recovery, so the EV should be decreased.

For each EV, the system may further determine the number of frames to be taken to improve the signal-to-noise ratio of the image or object in the subsequent HDR processing. Because the detected object has been brought back to the linear domain, it is possible to find the noise model parameters of the camera based on the camera's metadata, including camera analog gain and digital gain, when in the linear domain. The noise model may follow a Gaussian and Poisson distribution derived through calibration. Using the noise model, the noise level (denoted $N_1$) corresponding to the object's mean brightness Y can be obtained.

The system may further calculate a minimum or target noise level (denoted $N_T$) (corresponding to the minimum analog gain and digital gain of the camera) at this brightness (i.e., under a particular EV). Note that, when in the linear domain, the brightness of an object in the image may be proportional to the EV. By calculating $N_1/N_T$, the system may obtain the number of shots needed to equivalently reduce the noise level to $N_T$, which is the optimal number of shots for the current object at this brightness. In some embodiments, the number of frames corresponding to an EV may be limited by a predetermined threshold, meaning it cannot exceed a certain number. This frame-number threshold is determined by the performance of the HDR processing algorithm and the actual performance of the platform (e.g., a mobile platform).

In some examples, the object-detection process may output multiple objects. In such a case, the system may first determine the significant levels of the objects and then filter out insignificant objects based on a predetermined significance-level threshold. If all detected objects are insignificant, the system may output the default exposure combination, similar to the scenario where no object is detected in the current scene.

If one or more detected objects in the scene are significant, the system may perform a linear domain regression operation on the significant objects to bring them to the linear domain. The system may further calculate the mean brightness Y of each object, and then group the objects based on their Y values. Grouping objects with similar Y values into the same group can reduce redundant calculations. In some embodiments, objects with similar brightness (i.e., the difference in brightness is within a predetermined threshold)

are grouped together as one brightness group. In one example, the brightness of the objects may be within a 10-bit linear space (with a maximum value of 1023), a 12-bit linear space, or a 14-bit linear space, depending on the desired resolution. The brightness-similarity threshold may be set at 20. Other values (e.g., 30) may also be possible. In alternative examples, the brightness-similarity threshold may be determined by the ratio of interpolated Y values between two objects. If the ratio exceeds a predetermined value, the two objects will not be grouped together.

For each brightness group, the system may calculate the exposure ratio R=T/Y based on a target brightness T. The exposure ratio may be used to determine the optimal exposure setting for each brightness group. If the exposure ratio is greater than one, meaning that the group requires a brighter image for dynamic range recovery, the system may increase the EV. If the exposure ratio is less than one, meaning that the group requires a darker image for dynamic range recovery, the system may decrease the EV. The exposure values for the scene may include the optimal exposure values for all brightness groups.

For each brightness group (e.g., group k), the system may use the noise model derived from the cameras' metadata to obtain the noise level $N_k$. The system may also calculate, for each brightness group, the minimum or target noise level (denoted $N_{tk}$) corresponding to the minimum camera analog gain and digital gain. The system may determine how many frames are needed at the current brightness level (i.e., determined based on the current EV) to equivalently reduce the noise level to $N_{tk}$ by calculating $N_k/N_{Tk}$. In other words, the system may determine the optimal number of frames needed for the EV. The number of frames may be limited by a predetermined threshold, meaning it cannot exceed a certain number. This frame-number threshold is determined by the performance of the HDR processing algorithm and the actual performance of the platform (e.g., a mobile platform).

It is important to note that, in the scenario where the optimal exposure for each group is determined, it may be beneficial to supplement some additional exposures for the missing exposure steps to prevent the HDR fusion algorithm failure from excessively large exposure intervals. For example, if the optimal exposure for a dark group is $EV_1$, and the optimal exposure for a bright group is $EV_2$, where $EV_1$U$EV_2$, the camera system may be configured to add additional EVs between $EV_1$ and $EV_2$. The determined exposure combination may be returned to the system for the HDR algorithm to set up the frame capture.

Figure 4:
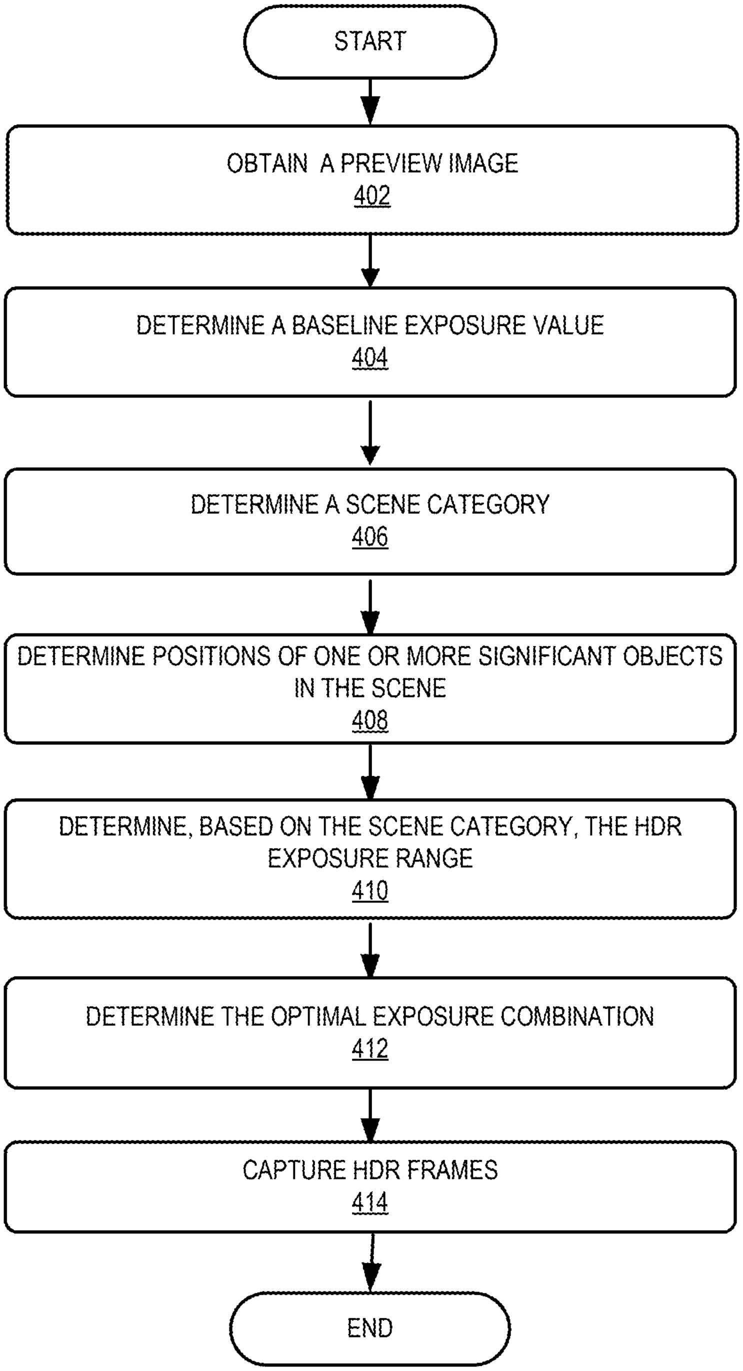
FIG. 4 presents a flowchart illustrating an exemplary process for determining the optimal exposure combination, according to one embodiment of the instant application.

FIG. 4 presents a flowchart illustrating an exemplary process for determining the optimal exposure combination, according to one embodiment of the instant application. During operation, a camera system may obtain a preview image of a to-be-captured scene (operation 402) and determine a baseline exposure value $EV_0$ (operation 404). In some embodiments, the camera system may include an AE module that calculates $EV_0$ in real time based on the current ambient brightness. When the scene captured by the camera is stable or undergoes only minor changes, the automatic exposure will be locked to the exposure setting corresponding to $EV_0$. Otherwise, it will continue to automatically calculate the exposure setting, converging towards the exposure value corresponding to the current ambient brightness.

Based on the preview image, the camera system may apply a machine-learning technique to determine, among a plurality of predetermined scene categories, a scene category corresponding to the scene (operation 406). In one example, there are ten predetermined scene categories. The system may also determine, using a machine-learning-based object-detection technique, the positions of one or more significant objects in the scene (operation 408). An object may be considered significant if its significant level (computed based on the size of the object and its distance to the image center) exceeds a predetermined threshold.

The camera system may determine, based on the scene category, the HDR exposure range (operation 410). More specifically, the camera system may look up a previously established scene-LUX-EV table using the scene category and the LUX value of the preview image as a search key to determine the HDR exposure range (i.e., the maximum and minimum exposures needed to recover the dynamic range). The scene-LUX-EV table may be obtained by performing tests on a large number of scenes belonging to the predetermined scene categories using a process similar to the one shown in FIG. 2. If it is determined that the maximum and minimum exposures are both equal to $EV_0$, the scene is not an HDR scene, and $EV_0$ is the optimal exposure.

The camera system may determine, based on the camera's metadata, the positions of significant objects in the scene, and the determined exposure range, the optimal exposure combination (operation 412). The optimal exposure combination may include one or more EV values and the number of frames to be captured for each EV value. The camera system may then capture HDR frames based on the exposure combination (operation 414).

Figure 5:
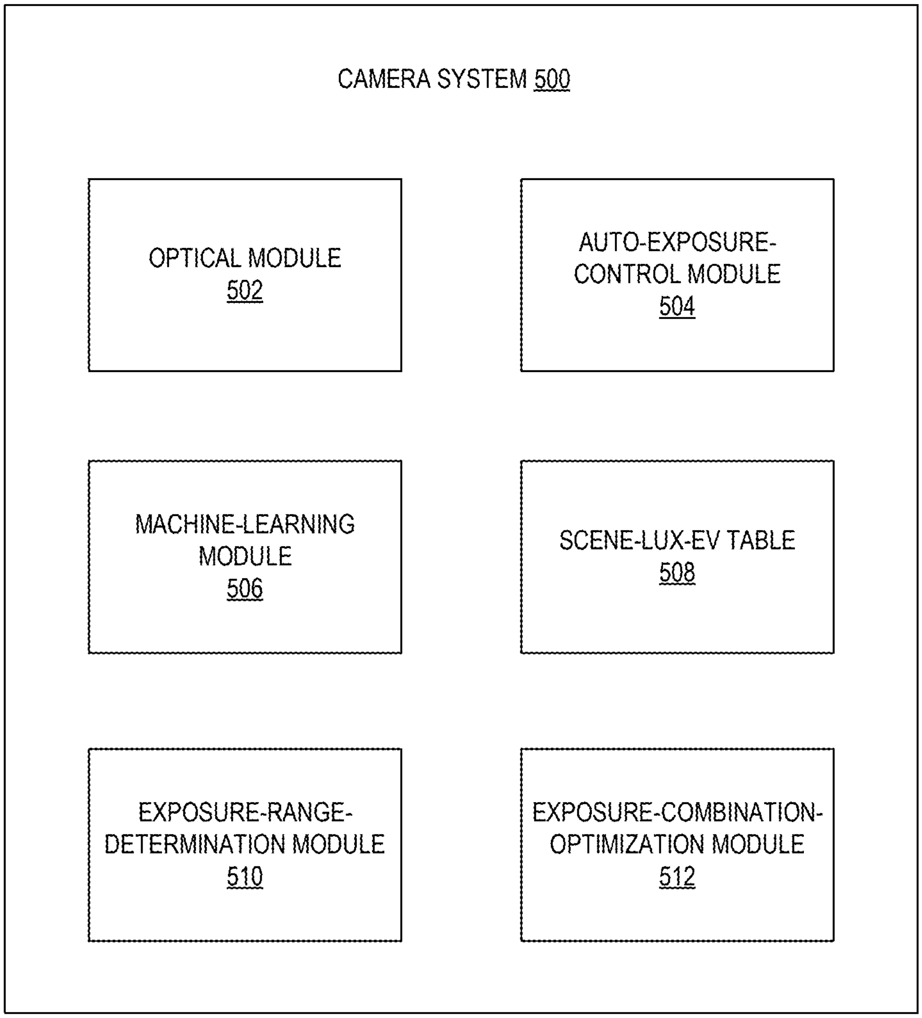
FIG. 5 illustrates an exemplary block diagram of a camera system, according to one embodiment of the instant application.

FIG. 5 illustrates an exemplary block diagram of a camera system, according to one embodiment of the instant application. Camera system 500 can include an optical module 502, an auto-exposure-control module 504, a machine-learning module 506, a scene-LUX-EV table 508, an exposure-range-determination module 510, and an exposure-combination-optimization module 512. In some embodiments, camera system 500 may be part of a mobile device, such as a smartphone or a tablet computer.

Optical module 502 may include various optical components needed for capturing images of real-world scenes. Examples of optical components may include but are not limited to lenses, prisms, mirrors, optical filters, shutters, apertures, etc. Auto-exposure-control module 504 may be responsible for determining the baseline exposure value ($EV_0$) of a to-be-captured scene based on the average brightness level of the scene.

Machine-learning module 506 can be responsible for determining, simultaneously, the category of the to-be-captured scene and the sizes/positions of one or more significant objects in the scene. In some embodiments, machine-learning module 506 may include a single feature-extraction backbone and two prediction head, one for scene clarification and one for object detection. The scene-clarification head may output a scene ID corresponding to a scene category among a plurality of predetermined scene categories. In one embodiment, the predetermined scene categories may include sunny outdoor, cloudy outdoor, snowy outdoor, rainy outdoor, foggy outdoor, sunrise/sunset, nighttime outdoor, nighttime mall, indoor mall, and indoor stage. The object-detection head may output one or more detected objects along with their positions and object categories.

Scene-LUX-EV table 508 can be a look table that maps the relationships between the different scene categories and EV ranges. Each EV range may specify a minimum EV and a maximum EV. In some embodiments, scene-LUX-EV table 508 may be established by performing, before the camera system is put into use, tests (similar to the one shown in FIG. 2) on a large number of scenes of known categories.

Exposure-range-determination module 510 can be used to determine the exposure range of the current scene based on the scene ID and LUX value. In some embodiments, exposure-range-determination module 510 may use a combination of the scene ID and LUX value of the current scene as a lookup key to look up the scene-LUX-EV table. If the lookup table returns an exposure range having the same maximum and minimum EV (e.g., $EV_0$), it is determined that the current scene is not an HDR scene, and $EV_0$ is the optimal exposure.

Exposure-combination-optimization module 512 can be responsible for optimizing the exposure combination (e.g., the optimal EVs and the number of frames to be captured for each EV). In some embodiments, exposure-combination-optimization module 512 may identify one or more significant objects in the scene based on the size and position of each object and group the objects based on their brightness. If there is no significant object in the scene, exposure-combination-optimization module 512 may output a default exposure combination based on the previously determined exposure range. Note that to determine the brightness of an object, exposure-combination-optimization module 512 may need to apply a linear domain regression operation on the object to bring the object to the liner domain based on the camera's metadata. The optimal EV for each brightness group may be determined based on the brightness of the object (under a particular EV, such as $EV_0$) and a target brightness. Moreover, for a particular EV, exposure-combination-optimization module 512 may optimize, based on a noise model and the camera's metadata, the number of frames to be captured to improve the signal-to-noise ratio of the object or image without jeopardizing performance (e.g., by taking unnecessary frames). In one example, the noise model may follow a Gaussian and Poisson distribution.

Figure 6:
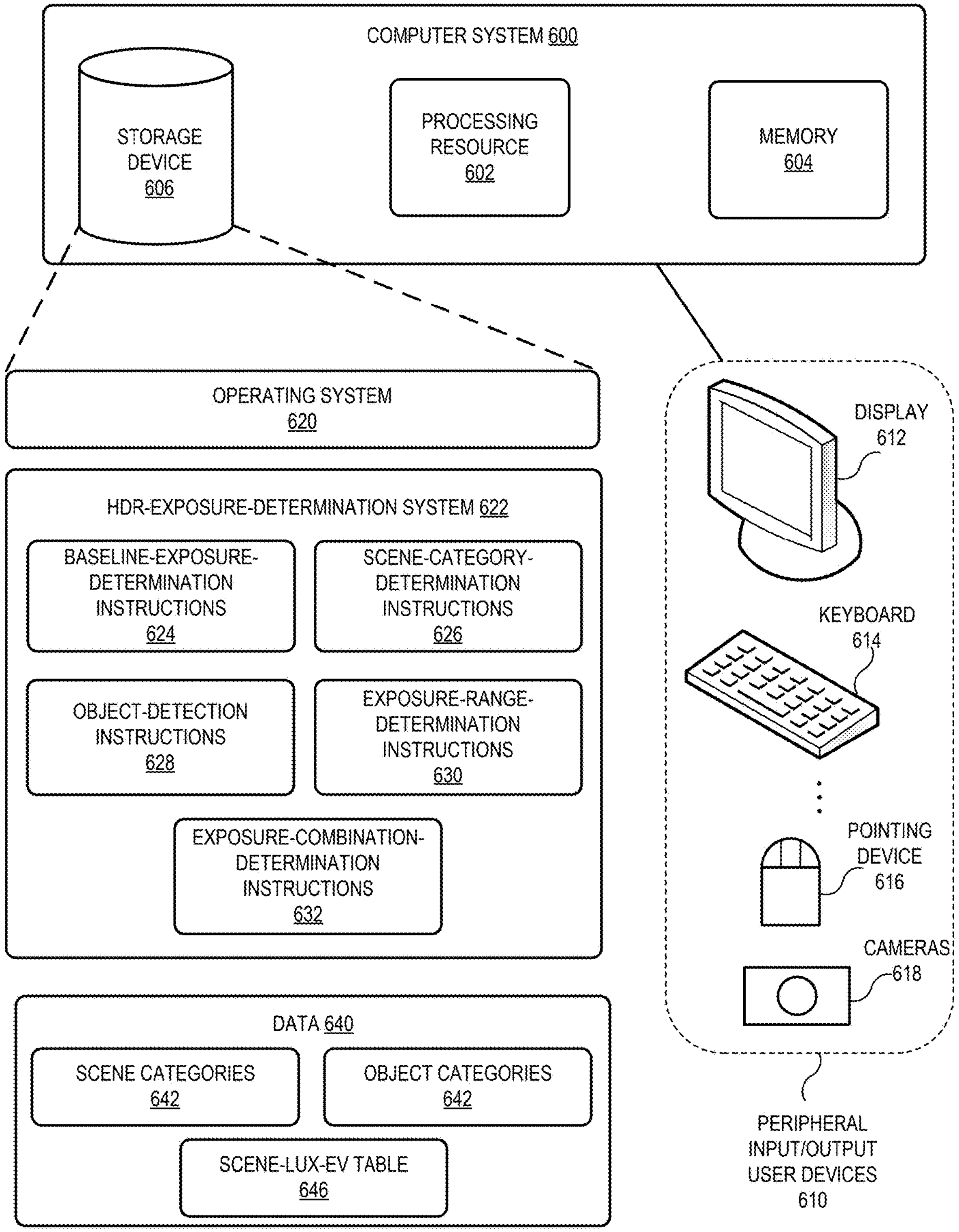
FIG. 6 illustrates an exemplary computer system for determining High Dynamic Range (HDR) exposure settings, according to one embodiment of the instant application.

FIG. 6 illustrates an exemplary computer system for determining HDR exposure settings, according to one embodiment of the instant application. Computer system 600 includes a processing resource 602, a memory 604, and a storage device 606.

In the examples described herein, a processing resource may include, for example, one processor or multiple processors included in a single computing device or distributed across multiple computing devices. As used herein, a "processor" may be at least one of a central processing unit (CPU), a semiconductor-based microprocessor, a graphics processing unit (GPU), a field-programmable gate array (FPGA) configured to retrieve and execute instructions, other electronic circuitry suitable for the retrieval and execution of instructions stored on a computer-readable storage medium, or a combination thereof. In the examples described herein, the processing resource may fetch, decode, and execute instructions stored on a storage medium to perform the functionalities described in relation to the instructions stored on the computer-readable medium. In other examples, the functionalities described in relation to any instructions described herein may be implemented in the form of electronic circuitry, in the form of executable instructions encoded on a computer-readable medium, or a combination thereof. The computer-readable storage medium may be located either in the computing device executing the instructions, or remote from but accessible to the computing device (e.g., via a computer network) for execution. In the examples illustrated herein, the node may be implemented by one computer-readable storage medium or multiple computer-readable storage media.

Furthermore, computer system 600 can be coupled to peripheral input/output (I/O) user devices 610, e.g., a display device 612, a keyboard 614, a pointing device 616, and a camera 618. Storage device 606 can store an operating system 620, an HDR-exposure-determination system 622, and data 640. In some embodiments, computer system 600 can be implemented as part of a standalone camera. In some embodiments, computer system 600 can be implemented as part of a mobile device (e.g., a smart phone or a tablet computer) equipped with a camera.

HDR-exposure-determination system 622 may include instructions, which when executed by computer system 600, can cause computer system 600 or processing resource 602 to perform methods and/or processes described in this disclosure. Specifically, HDR-exposure-determination system 622 can include instructions for automatically determining, based on a preview image of a to-be-captured scene, a baseline exposure value (baseline-exposure-determination instructions 624), instructions for applying a machine-learning technique to determine, among a plurality of predetermined scene categories, a scene category to which the current scene belongs (scene-category-determination instructions 626), instructions for detecting objects and their positions in the scene (object-detection instructions 628), instructions for determining, based on the scene category, the HDR exposure range (exposure-range-determination instructions 630), and instructions for determining, based on the camera's metadata, the positions of significant objects in the scene, and the determined exposure range, the optimal exposure combination (exposure-combination-determination instructions 632). Data 640 can include previously established scene categories 642, object categories 644, and a scene-LUX-EV table 646.

In general, this disclosure presents a solution to the problem of automatically determining the optimal HDR exposure settings. The disclosed system may combine machine learning techniques and HDR bracketing techniques to determine, with improved efficiency and accuracy, the optimal exposure combination of a to-be-captured scene. A multi-task deep learning neural network may be used to, simultaneously, classify the to-be-captured scene to one of a plurality of predetermined categories and detect objects in the scene. The disclosed system may pre-collect and compile optimal exposure ranges corresponding to different illuminance (LUX value) for each predetermined scene category, summarizing the mapping relationship between the scene category, the LUX value, and the exposure range into a scene-LUX-lookup table. The exposure range of the to-be-captured scene may be obtained swiftly by performing a table lookup operation. The system may further fine-tune the exposure combination based on the significant objects in the scene, their brightness levels, and the camera metadata.

Data structures and program code described in this detailed description are typically stored on a non-transitory computer-readable storage medium, which may be any device or medium that can store code and/or data for use by a computer system. Non-transitory computer-readable storage media include, but are not limited to, volatile memory; non-volatile memory; electrical, magnetic, and optical storage devices, solid-state drives, and/or other non-transitory computer-readable media now known or later developed.

Methods and processes described in the detailed description can be embodied as code and/or data, which may be stored in a non-transitory computer-readable storage medium as described above. When a processor or computer system reads and executes the code and manipulates the data stored on the medium, the processor or computer system performs the methods and processes embodied as code and data structures and stored within the medium.

Furthermore, the optimized parameters from the methods and processes may be programmed into hardware modules such as, but not limited to, application-specific integrated circuit (ASIC) chips, field-programmable gate arrays (FPGAs), and other programmable-logic devices now known or hereafter developed. When such a hardware module is activated, it performs the methods and processes included within the module.

The foregoing embodiments have been presented for purposes of illustration and description only. They are not intended to be exhaustive or to limit this disclosure to the forms disclosed. Accordingly, many modifications and variations will be apparent to practitioners skilled in the art. The scope is defined by the appended claims, not the preceding disclosure.

What is claimed is:

1. A compute-implemented method for determining High Dynamic Range (HDR) exposure settings of a camera for capturing a scene, the method comprising:

- determining a baseline exposure value of the camera for capturing the scene;
- obtaining, by the camera using the baseline exposure, a preview image of the scene;
- applying a machine-learning technique on the preview image to determine, among a plurality of predetermined scene categories, a scene category corresponding to the scene;
- determining, based on the scene category corresponding to the scene, an HDR exposure range;
- detecting a number of objects in the scene;
- identifying, among the number of detected objects, a number of significant objects based on size and position of each object;
- determining, based on the HDR exposure range, the significant objects in the scene, and metadata associated with the camera, an exposure combination specifying one or more exposure values and a number of frames to be captured corresponding to each exposure value;
- wherein determining the exposure combination comprises determining, for each significant object, an optimal exposure value based on a brightness level of the significant object and a target brightness level, and determining, for the optimal exposure value, a number of frames to be captured based on a noise model derived from the metadata associated with the camera.

2. The method of claim 1, wherein applying the machine-learning technique comprises implementing a multi-task deep-learning neural network to simultaneously determine the scene category corresponding to the scene and detect the one or more objects.

3. The method of claim 1, wherein the plurality of predetermined scene categories comprises: sunny outdoor, cloudy outdoor, snowy outdoor, rainy outdoor, foggy outdoor, sunrise/sunset, nighttime outdoor, nighttime mall, indoor mall, and indoor stage.

4. The method of claim 1, wherein determining the exposure combination further comprises:

- in response to determining that the scene contains no significant object, outputting a default exposure combination corresponding to the HDR exposure range.

5. The method of claim 1, wherein determining the exposure range comprises looking up a previously established lookup table based on the scene ID and brightness level of the scene.

6. The method of claim 5, wherein the lookup table is established by performing tests to determine maximum and minimum exposure values of a plurality of scenes with known scene categories and different brightness levels.

7. A computing system, comprising:

- a processor; and
- a memory coupled to the processor and storing instructions that when executed by the processor cause the processor to perform a method for determining High Dynamic Range (HDR) exposure settings of a camera for capturing a scene, the method comprising:
  - determining a baseline exposure value of the camera for capturing the scene;
  - obtaining a preview image of the scene captured by the camera using the baseline exposure;
  - applying a machine-learning technique on the preview image to determine, among a plurality of predetermined scene categories, a scene category corresponding to the scene;
  - determining, based on the scene category corresponding to the scene, an HDR exposure range;
  - detecting a number of objects in the scene;
  - identifying, among the number of detected objects, a number of significant objects based on size and position of each object; and
  - determining, based on the HDR exposure range, the significant objects in the scene, and metadata associated with the camera, an exposure combination specifying one or more exposure values and a number of frames to be captured corresponding to each exposure value;
  - wherein determining the exposure combination comprises determining, for each significant object, an optimal exposure value based on a brightness level of the significant object and a target brightness level, and determining, for the optimal exposure value, a number of frames to be captured based on a noise model derived from the metadata associated with the camera.

8. The computing system of claim 7, wherein applying the machine-learning technique comprises implementing a multi-task deep-learning neural network to simultaneously determine the scene category corresponding to the scene and detect the one or more objects.

9. The computing system of claim 7, wherein the plurality of predetermined scene categories comprises: sunny outdoor, cloudy outdoor, snowy outdoor, rainy outdoor, foggy outdoor, sunrise/sunset, nighttime outdoor, nighttime mall, indoor mall, and indoor stage.

10. The computing system of claim 7, wherein determining the exposure combination further comprises:

- in response to determining that the scene contains no significant object, outputting a default exposure combination corresponding to the HDR exposure range.

11. The computing system of claim 7, wherein determining the exposure range comprises looking up a previously established lookup table based on the scene ID and brightness level of the scene.

12. The computing system of claim 11, wherein the lookup table is established by performing tests to determine maximum and minimum exposure values of a plurality of scenes with known scene categories and different brightness levels.

13. A non-transitory computer-readable storage medium storing instructions that when executed by a computer cause the computer to perform a method for determining High Dynamic Range (HDR) exposure settings of a camera for capturing a scene, the method comprising:

determining a baseline exposure value of the camera for capturing the scene;

obtaining a preview image of the scene captured by the camera using the baseline exposure;

applying a machine-learning technique on the preview image to determine, among a plurality of predetermined scene categories, a scene category corresponding to the scene;

determining, based on the scene category corresponding to the scene, an HDR exposure range;

detecting a number of objects in the scene;

identifying, among the number of detected objects, a number of significant objects based on size and position of each object; and determining, based on the HDR exposure range, the significant objects in the scene, and metadata associated with the camera, an exposure combination specifying one or more exposure values and a number of frames to be captured corresponding to each exposure value;

wherein determining the exposure combination comprises determining, for each significant object, an optimal exposure value based on a brightness level of the significant object and a target brightness level, and determining, for the optimal exposure value, a number of frames to be captured based on a noise model derived from the metadata associated with the camera.

14. The non-transitory computer-readable storage medium of claim 13, wherein determining the exposure range comprises looking up a previously established lookup table based on the scene ID and brightness level of the scene.

* * * * *